(12) United States Patent
Frazier et al.

(10) Patent No.: US 7,807,056 B2
(45) Date of Patent: Oct. 5, 2010

(54) SYSTEM AND METHOD FOR BIOREMEDIATING OIL FIELD CUTTINGS

(75) Inventors: W. Lynn Frazier, 713 Snug Harbor, Corpus Christi, TX (US) 78402; Gary Sweetman, Grand Prairie, CA (US); Darin Harding, Grand Prairie, CA (US)

(73) Assignee: W. Lynn Frazier, Corpus Christi, TX (US)

( * ) Notice: Subject to any disclaimer, the term of this patent is extended or adjusted under 35 U.S.C. 154(b) by 225 days.

(21) Appl. No.: 12/195,986

(22) Filed: Aug. 21, 2008

(65) Prior Publication Data

US 2009/0078647 A1    Mar. 26, 2009

Related U.S. Application Data

(60) Provisional application No. 60/957,113, filed on Aug. 21, 2007.

(51) Int. Cl.
*C02F 3/00* (2006.01)
*C02F 11/00* (2006.01)

(52) U.S. Cl. .................... 210/603; 210/609; 210/259; 210/908

(58) Field of Classification Search ................ 210/603, 210/608, 609, 252, 259, 908, 909
See application file for complete search history.

(56) References Cited

U.S. PATENT DOCUMENTS 3,202,285 A * 8/1965 Williams ................. 210/195.4
4,070,292 A * 1/1978 Adams ..................... 210/195.1
5,637,221 A * 6/1997 Coyne ......................... 210/608
6,576,130 B2 * 6/2003 Wallace ....................... 210/605
7,160,474 B2    1/2007 Harding
2008/0251449 A1 * 10/2008 Hausin et al. ............... 210/603

OTHER PUBLICATIONS

Coupling cost-effective fluid designs and optimized treatment techniques for clean up of hydrocarbon contaminated drill cuttings, Halliburton Fluid Systems, 2006, U.S.A.

* cited by examiner

*Primary Examiner*—Fred Prince
(74) *Attorney, Agent, or Firm*—Edmonds & Nolte, P.C.

(57) ABSTRACT

Apparatus and methods for bioremediating hydrocarbon contaminated solids. The method can include introducing a slurry comprising one or more drilling fluids and one or more hydrocarbon contaminated solids to a settling system. The settling system can include one or more housings having a receiving compartment at a first end thereof and a collecting compartment at a second end thereof. A barrier can be disposed in the receiving compartment, and at least one wall can be disposed transversely in the housing between the receiving and collecting compartments. The wall can have at least one aperture formed therethrough and at least one flow-restricting baffle disposed thereon, wherein the one or more baffles extend perpendicularly from the wall. The separated hydrocarbon contaminated solids can be contacted with one or more microorganism populations disposed between the receiving compartment and the collecting department.

20 Claims, 6 Drawing Sheets

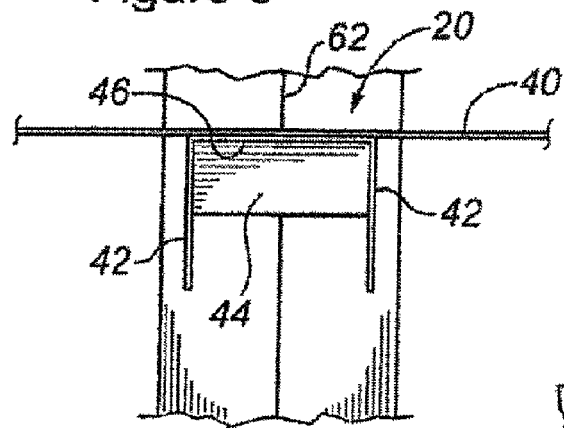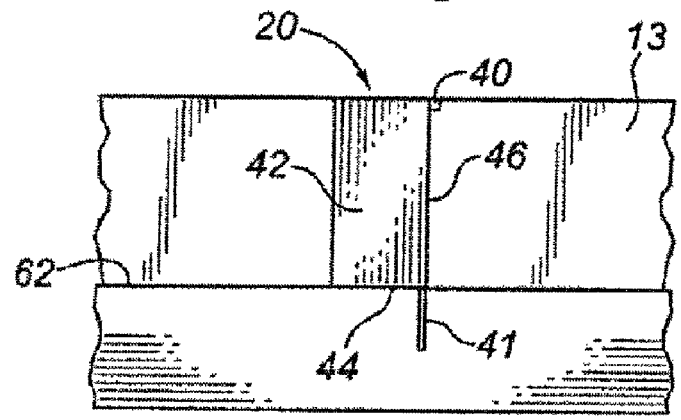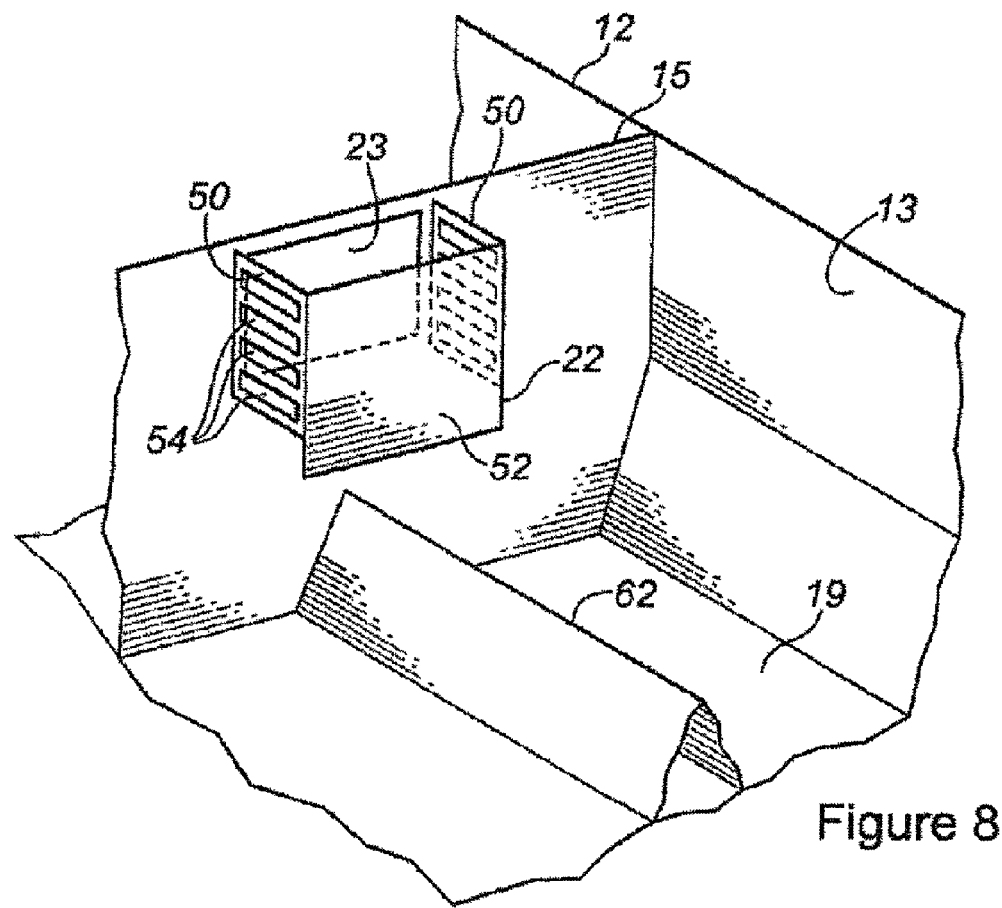

SYSTEM AND METHOD FOR BIOREMEDIATING OIL FIELD CUTTINGS

CROSS-REFERENCE TO RELATED APPLICATIONS

This application claims priority to U.S. Provisional Patent Application having Ser. No. 60/957,113, filed on Aug. 21, 2007, which is incorporated by reference herein.

BACKGROUND OF THE INVENTION

1. Field of the Invention

Embodiments of the present invention generally relate to systems and methods for oil field cutting bioremediation. More particularly, embodiments of the present invention relate to systems and methods for bioremediation of hydrocarbon contaminated drill cuttings from oil and gas wellbores.

2. Description of the Related Art

The drilling of wells in the recovery of oil and gas typically comprises a rig drilling the well with a hollow drill string. As the well is being drilled, drilling fluids are pumped down the bore of the string. The drilling fluid passes through openings in the drill bit and returns to the surface through the annulus surrounding the string, carrying the cuttings produced by the drill bit. The drilling fluid is then recycled to remove the cuttings so that it may be used again.

Traditional methods of recycling drilling fluid include using a centrifuge to separate the liquid from the cuttings. In large drilling operations, to keep up with the volume of drilling fluid used, it is necessary to use either a very large centrifuge or to use a plurality of centrifuges. In either case, the cost of operating such a drilling fluid recycling system is substantial.

Fluid recycling system using setting tanks and centrifuges have been used. The settling tank is used as a preliminary step to settle the cuttings from the fluid. The drill cuttings often remain in suspension in the fluid and are often referred to as "solids." Flocculating agents may be introduced into the tank to assist in the settling of the solids. The drilling fluids are pumped into the receiving end of the tank. The tank has a plurality of transverse walls or baffles that form a plurality of compartments within the tank. Each wall has an opening to permit the flow of fluid from an upstream compartment to a downstream compartment. The openings are positioned on the walls in such a manner that the fluid follows a sinuous path as it flows from the receiving end to the collecting end of the tank. As fluid flows from compartment to compartment, solids in the fluid settle to the bottom of the tank.

Once fluid reaches the collecting end of the tank, it is withdrawn from the tank to be re-used in the drilling operation. The settled or separated solids are conveyed towards the receiving end of the tank using an auger. A slurry of settled solids and fluid are withdrawn from the tank and pumped through a centrifuge. Fluid recovered from the centrifuge is re-introduced into the tank at the receiving end.

While using the combination of settling tank and centrifuge is an improvement in comparison to using a centrifuge by itself, in practice, this circuit is often unable to keep up with the throughput of drilling fluid required in drilling a well. It is often necessary to temporarily stop drilling until the settling tank and centrifuge can catch up and recover enough drilling fluid for the drilling operation.

Therefore, there is a need for a new system and method for recovering and recycling drilling fluid in sufficient quantity for typical drilling operations.

SUMMARY OF THE INVENTION

Apparatus and methods for bioremediating hydrocarbon contaminated solids. In at least one specific embodiment, the method can include introducing a slurry comprising one or more drilling fluids and one or more hydrocarbon contaminated solids to a settling system. The settling system can include one or more housings having a receiving compartment at a first end thereof and a collecting compartment at a second end thereof. A barrier can be disposed in the receiving compartment, and at least one wall can be transversely disposed in the housing between the receiving and collecting compartments. The wall can have at least one aperture formed therethrough and at least one flow-restricting baffle disposed thereon, wherein the one or more baffles can extend perpendicularly from the wall. The slurry can flow across the barrier, and the hydrocarbon contaminated solids in the slurry can be separated from the drilling fluid by causing the slurry to reverse direction and flow around the barrier. The separated hydrocarbon contaminated solids can be contacted with one or more microorganism populations disposed between the receiving compartment and the collecting department.

In at least one specific embodiment, the apparatus can include a housing having a receiving compartment at a first end thereof and a collecting compartment at a second end thereof. A substantially vertical flow-reversing barrier can be disposed in the receiving compartment. The barrier can be adapted to receive a slurry containing drilling fluid and one or more hydrocarbon contaminated solids, the barrier can be capable of causing the slurry to reverse direction and flow around the barrier and can cause at least some of the solids in the slurry to separate from the drilling fluid. At least one wall can be transversely disposed in the housing between the receiving and collecting compartments. The wall can have at least one aperture formed therethrough and at least one flow-restricting baffle disposed thereon, wherein the one or more baffles can extend perpendicularly from the wall. One or more microorganism populations can be present to selectively remove the hydrocarbons from the separated solids. A conveyor can be used for moving the separated solids from the housing.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6 depicts a top plan view of the flow-reversing barrier of the settling system depicted in FIG. 1B, according to one or more embodiments.

FIG. 7 depicts a side elevation view of the flow-restricting baffle of the settling system depicted in FIG. 1B, according to one or more embodiments.

FIG. 8 depicts a perspective view of the flow-restricting baffle of the settling system depicted in FIG. 1B, according to one or more embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Figure 1A:
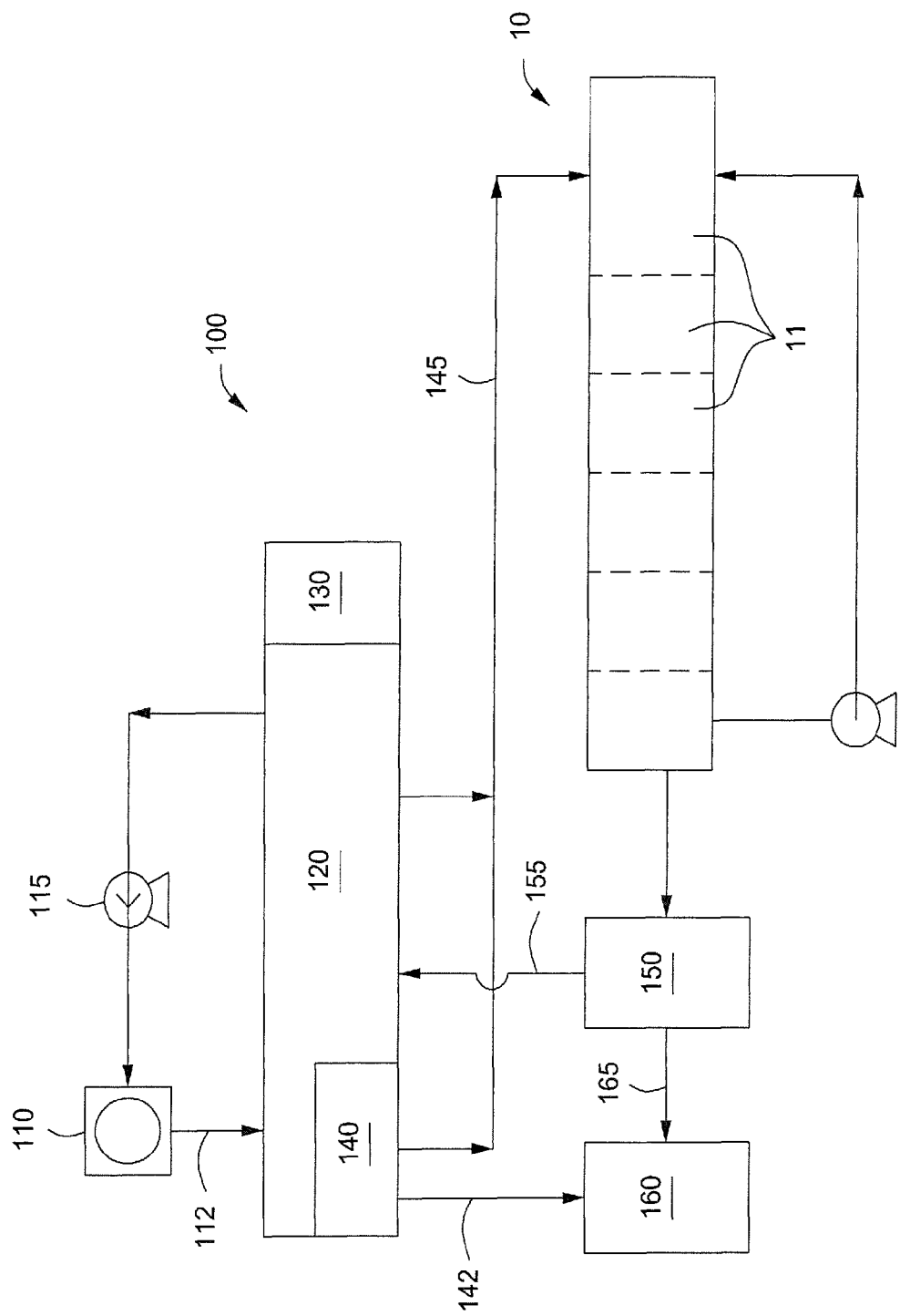
FIG. 1A depicts a perspective view of a system for bioremediation of hydrocarbon contaminated solids from oil and gas wellbores, according to one or more embodiments.

FIG. 1A depicts a plan view of an illustrative system 100 for bioremediation of hydrocarbon contaminated solids from oil and gas wellbores, according to one or more embodiments. In one or more embodiments, the system 100 can include one or more wellbores 110, drilling fluid pumps 115, mud tanks 120, mixing tanks 130, shakers 140, centrifuges 150, disposal bins 160, and settling system 10. Drilling fluid from the mud tanks 120 can be conveyed to the one or more wellbores 110 via the pump 115. Used drilling fluids and solids, such as drill cuttings, sand, gravel, and other particulates, from the wellbore 110 can be sent to and collected in the shaker 140 via line 112.

The shakers 140 can be any device or mechanism capable of separating liquids from solids. In one or more embodiments, the shaker 140 can have a wire cloth screen that vibrates as the drilling fluid and solids flow on top of the screen. The liquid and solids having a particle size less than the mesh openings can pass through the screen, while larger solids are retained on the screen. Those larger solids that are not allowed to pass through the mesh can eventually fall off the back of the shaker 140 into the disposal bins 160 via line 142 or simply allowed to pile behind the shaker 140. Such disposal pile can be removed for treatment and/or disposal.

From the shakers 140, the used drilling fluid having smaller solids contained therein is sent to the settling system 10 via line 145. The settling system 10 can include two or more zones or compartments 11 to separate the solids from the liquids. The settling system 10 is explained in more detail below. In operation, each zone 11 provides a torturous path and pressure drop for the drilling fluid having the solids dispersed therein, allowing the solids to drop while passing along the liquid phase. The liquid phase can flow through the settling system 10 to the one or more centrifuges 150, which can separate any fines or smaller particles that remain entrained in the drilling fluid. The drilling fluid that is free or essentially free of any solids can be returned to the mud tanks 120 via line 155 for subsequent drilling operations. The separated solids or fines from the centrifuges 150 can be directed to the one or more disposal bins 160 via line 165, where the contents therein can be removed for treatment and/or disposal.

In one or more embodiments, any one of the one or more zones 11 can include one or more microorganism populations to selectively remove any hydrocarbons from the separated solids that collect at the bottom thereof. As mentioned above, the hydrocarbon-containing solids or hydrocarbon contaminated solids in the used drilling fluids separate and settle at the bottom of the settling system 10 while the liquid phase passes over a top portion thereof. A hydrocarbon-containing solid or hydrocarbon contaminated solid can contain as much as 99 wt % hydrocarbon. Such solids can contain of from 1 wt % to 99 wt %; or 5 wt % to 95 wt %; or 10 wt % to 90 wt %; or 15 wt % to 85 wt %; or 20 wt % to 80 wt %; or 30 wt % to 70 wt %; or 40 wt % to 60 wt %; or about 50 wt % hydrocarbon. Such solids can have a mesh size of 200 or less, such as 190 or less, 180 or less, 170 or less, 160 or less, 150 or less, 140 or less, 130 or less, 120 or less, 110 or less, 100 or less, or 50 or less.

The solids are typically slurried in the bottom of the settling system 10 with some of the drilling fluid that remains in the bottom. The microorganisms can convert the hydrocarbons on or entrained in the solids into carbon dioxide, water, and/or biomass. The resulting biomass can be disposed or further converted to useful energy. For example, the biomass can be used in conjunction with a gasification system to produce a syngas.

Suitable microorganisms have a particular appetite for hydrocarbons. As such, the microorganisms are selective toward hydrocarbons and not drilling fluids. Illustrative microorganisms include but are not limited to bacteria and fungi. Preferred microorganisms are commercially available from Rapid Energy Services.

As used herein, the term "drilling fluid" refers to any fluid that is not a hydrocarbon that is used in hydrocarbon drilling operations, including muds and other fluids that contain suspended solids, emulsified water or oil. The term "mud" as used herein refers to all types of water-base, oil-base and synthetic-base drilling fluids, including all drill-in, completion and work over fluids.

Figure 1B:
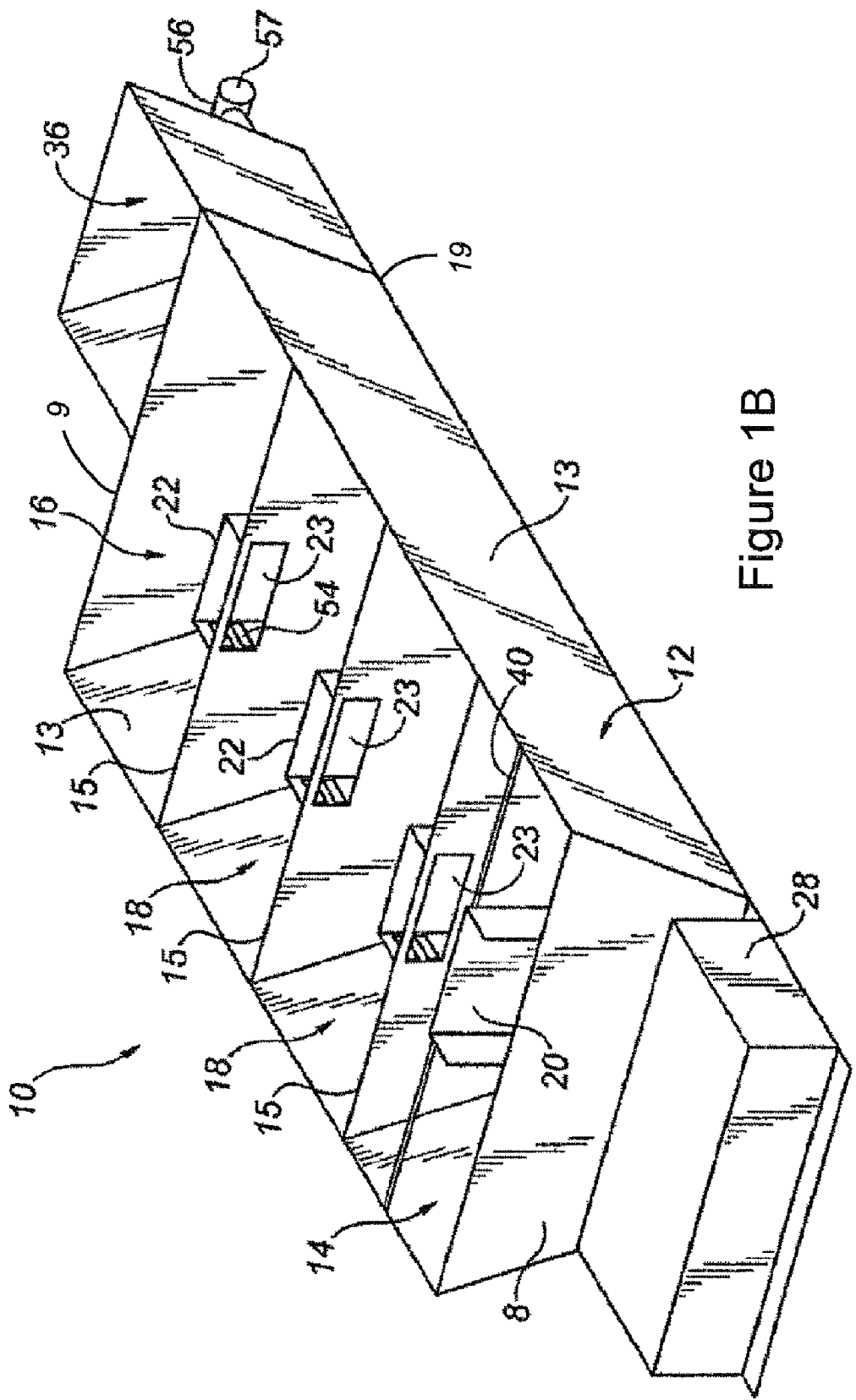
FIG. 1B depicts a plan view of an illustrative settling system for separating solids from a used drilling fluid, according to one or more embodiments.
Figure 2:
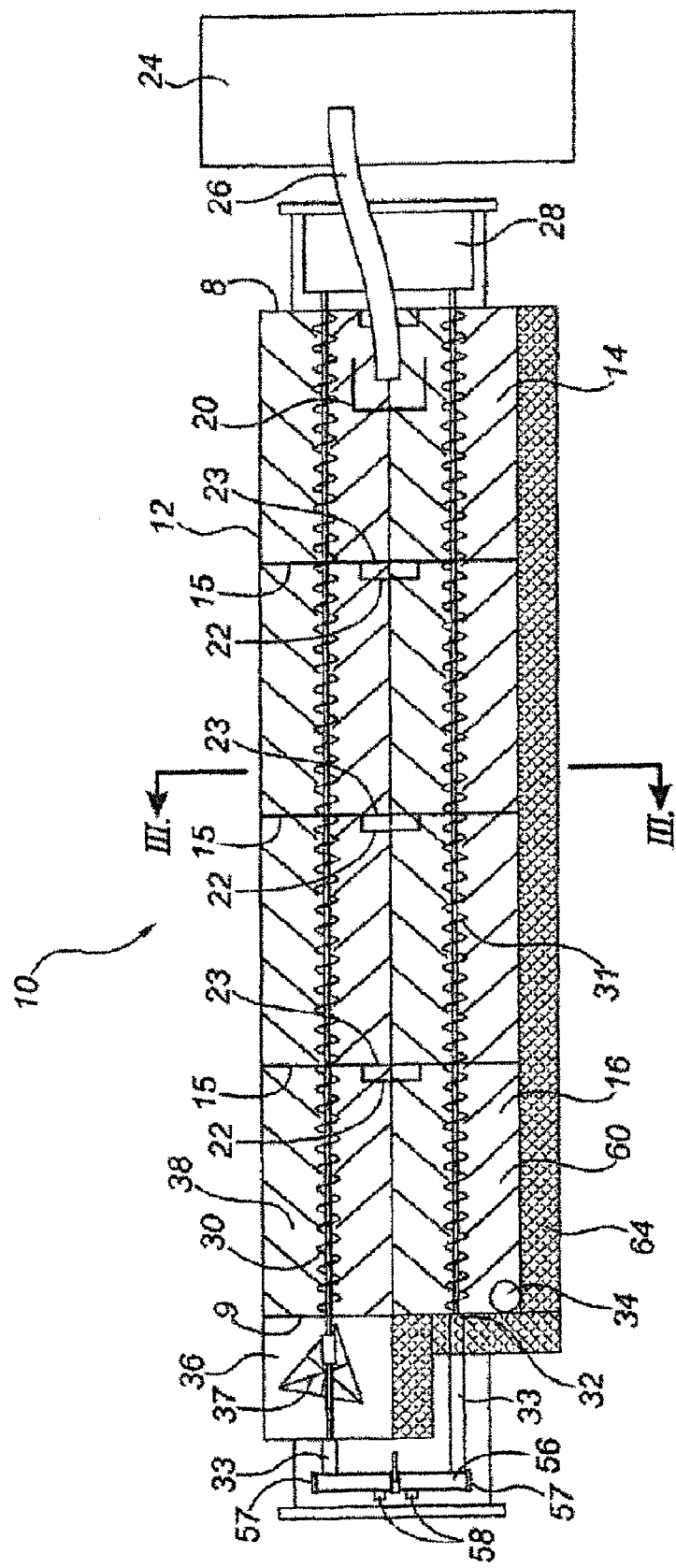
FIG. 2 depicts a partial cross section view of the settling system depicted in FIG. 1B.

FIG. 1B depicts a plan view of an illustrative settling system 10 for separating solids from a drilling fluid, and FIG. 2 depicts a partial cross section view of the settling system 10, according to one or more embodiments. The settling system 10 can include one or more settling tanks or housings 12 arranged in parallel or series. Each settling tank 12 can include a first end wall 8, a second end wall 9, side walls 13, and a bottom 19. The settling tank 12 can have a shape that is rectangular, square, spherical, or the like. In one or more embodiments, the settling tank 12 is rectangular having a length to width ratio of at least 5:1 (5 to 1), such as 6:1; 7:1; 8:1; 9:1; or 10:1. The height of the settling tank 12 can vary depending on the volume of drilling fluid to be processed. In one or more embodiments, the settling tank 12 has a height of about 1 foot or more, such as 3 ft, 5 ft, or 10 ft or more. In one or more embodiments, the settling tank 12 has the capacity to handle at least 10,000 gallons of fluid, such as 12,000 gallons or more, 15,000 gallons or more, or 20,000 gallons of more.

In one or more embodiments, the settling tank 12 can include two or more dividing or transverse walls 15 (three are shown) defining two or more zones therebetween. In one or more embodiments, a first transverse wall 15 can define the receiving zone 14 adjacent to the first end wall 8; a second transverse wall 15 can define the collecting zone 16 adjacent the second end wall 9; and a third transverse wall 15 can define the two intermediate zones 18 between the receiving zone 14 and the collecting zone 16. The transverse walls 15 can define and separate the receiving zone 14, intermediate zones 18, and collecting zone 16, which are within the tank 12. Each transverse wall 15 can have an aperture or opening 23 located near or at the top thereof. In one or more embodiments, each opening 23 can be approximately 12 inches high by 18 inches wide. A flow-restricting baffle 22 can be mounted on the downstream side of each transverse wall 15 and can be aligned with the opening 23.

In one or more embodiments, the settling system 10 can include one or more mixing zones 36 disposed or otherwise attached to the tank 12 at an end opposite the receiving zone 14. The mixing zone 36 can contain one or more mixers 37, as best depicted in FIG. 2. As discussed in more detail below, the used drilling fluid having solids disposed therein can be mixed with one or more additives or agents in the mixing zone 36 to facilitate separation of the solids from the liquids. For example, the mixer 37 can be used to prepare a flocculating chemical agent that assists in settling solids from the drilling fluid. In one or more embodiments, the microorganisms can be added to the drilling fluid within the mixing zone 36.

The used drilling fluid containing one or more solids can be collected in the holding tank 24. The drilling fluid can be pumped or allowed to gravity flow from the holding tank 24 into the receiving zone 14 and can be directed towards the flow-reversing barrier 20 via the inlet 26. In one or more embodiments, the used drilling fluid can be sent directly to the receiving zone 14. Within the receiving zone 14, the fluid flow is impeded or stopped by the flow-reversing barrier 20 and reversed around the side panels. The flow-reversing barrier 20 can be supported by a bar 40 that can run transverse across the top of the settling tank 12. The flow-reversing panel 20 can be best understood with reference to FIGS. 4-7. The reversal of fluid flow causes heavier solids to settle to the bottom 19 of the settling tank 12, within the troughs 38 and 60. As the fluid level rises in the receiving zone 14, the fluid can overflow into the adjacent downstream intermediate zones 18 through the openings 23 in the transverse walls 15. The fluid that flows through the openings 23 encounters the flow-restricting baffles 22 and deflects downwards to the bottom 19 of the tank 12. The flow of the fluid through the baffle 22 causes solids in the fluid to settle to the bottom of settling tank 12. Fluid can flow from zone to zone, by passing through successive baffles 22 in each transverse wall 15, until the fluid reaches the collecting zone 16. Fluid can be withdrawn from the collecting zone 16, by the pump 34, to be used again in the drilling operations, recycled to the holding tank 24, and/or the receiving zone 14.

The solids that have settled to the bottom 19 of settling tank 12 can be conveyed by the augers 30 and 31 through the troughs 38 and 60 towards the collecting zone 16. The augers 30 and 31 can expel a slurry of solids and fluid through the outlets 32 on the end wall 9. The augers 30 and 31 can be rotated by drive mechanism 28. The interaction between augers 30 and 31 and the drive mechanism 28 can be best understood with reference to FIG. 3. In one or more embodiments, the outlets 32 can be coupled to one or more pipes 33.

Each pipe 33 can be about 10 inches in diameter. The pipes 33 can extend to intersect with the plenum 56. The plenum 56 can be made of 10 inch diameter pipe. The plenum 56 can have one or more end covers 57. The end covers 57 can be removable to allow for cleaning-out of the plenum 56. The plenum 56 can receive the slurry discharged from the outlets 32 and direct the slurry to the centrifuge 150 via the discharge ports 58. The ports 58 can be about 4 inches in diameter and can be connected via tubes, pipes or hoses (not shown) to a pump (not shown) to transfer the slurry to the centrifuge 150.

In one or more embodiments, drilling fluid can be skimmed from the collecting zone 16 and mixed with one or more chemicals, agents, and/or microorganisms in the mixer 37. The resulting mixture can be pumped via pump 34 to the receiving zone 14, i.e. recycled, to mix with the received drilling fluid and assist in the settling of solids contained therein. In one or more embodiments, the settling system 10 can include a walkway or grating 64. The walkway or grating 64 can be mounted on a sidewall 13 to permit an operator to inspect the fluid as it passes through settling tank 12. One or more sampling stations for collecting and measuring the hydrocarbon content of the slurry can be located along the sidewall 13.

Figure 3:
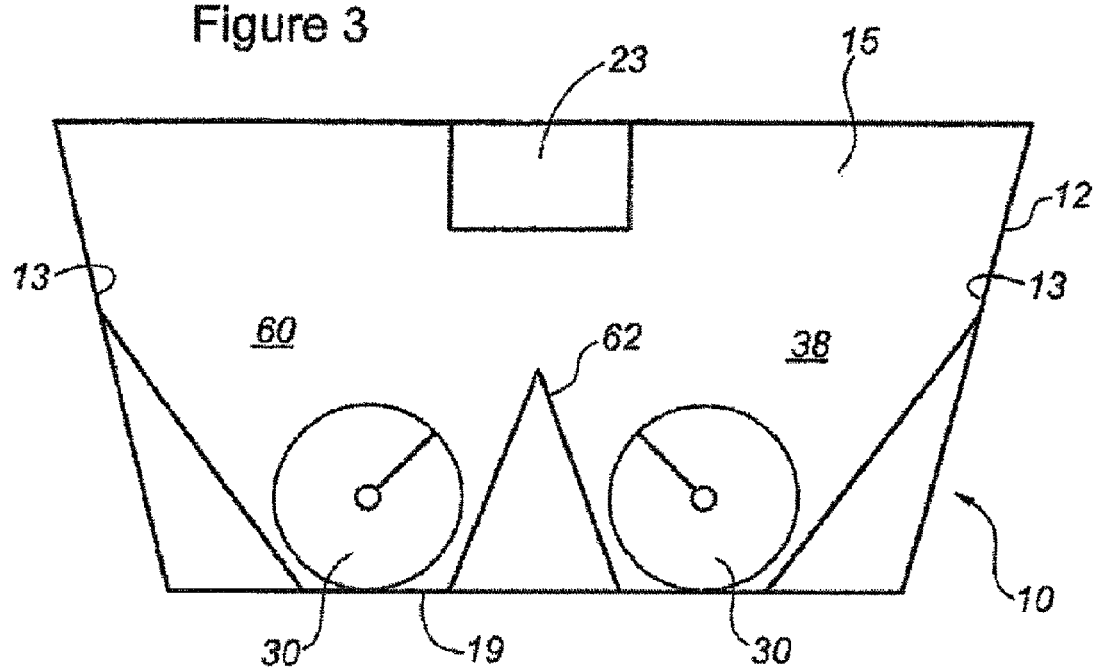
FIG. 3 depicts a cross-sectional end view of the settling system along lines III-III shown in FIG. 2.
Figure 4:
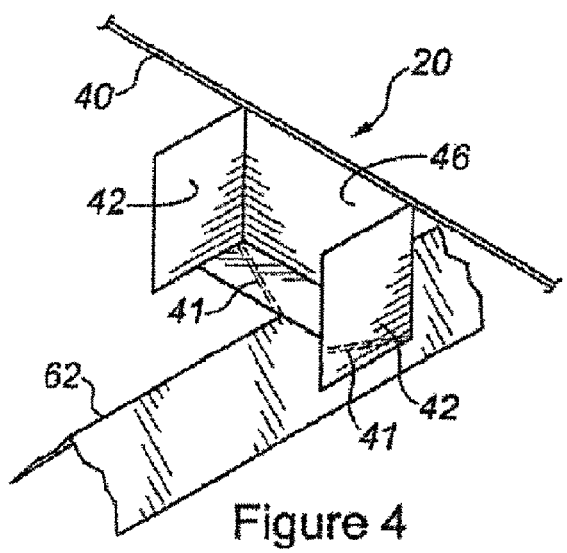
FIG. 4 depicts a perspective view of the flow-reversing barrier of the settling system depicted in FIG. 1B, according to one or more embodiments.
Figure 5:
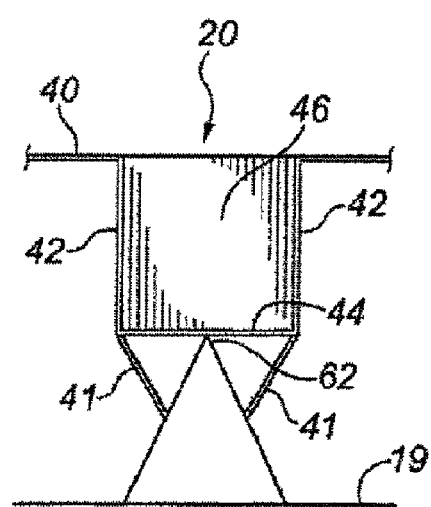
FIG. 5 depicts a front elevation view of the flow-reversing barrier of the settling system depicted in FIG. 1B, according to one or more embodiments.
Figure 9:
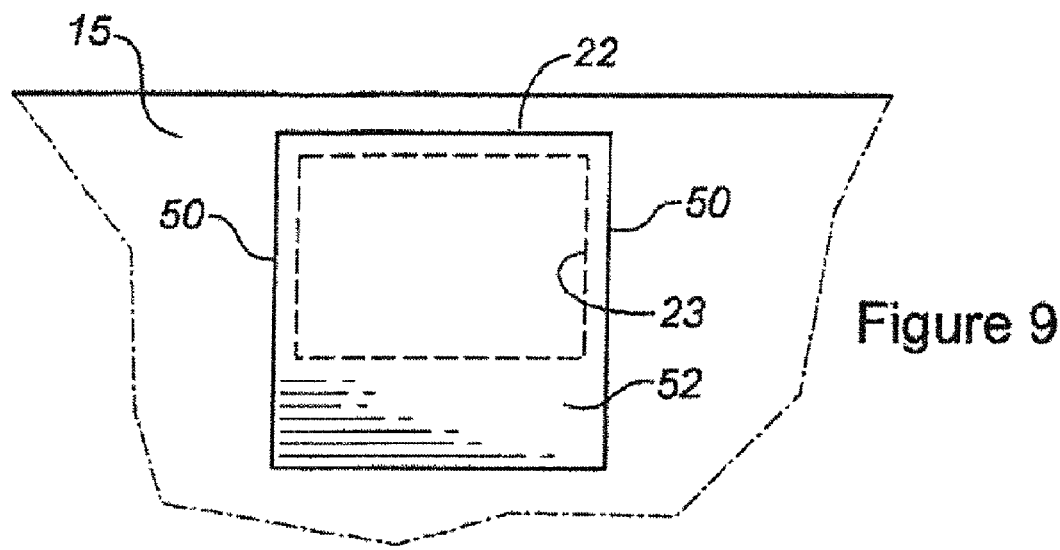
FIG. 9 depicts a front elevation view of the flow-restricting baffle of the settling system depicted in FIG. 1B, according to one or more embodiments.
Figure 10:
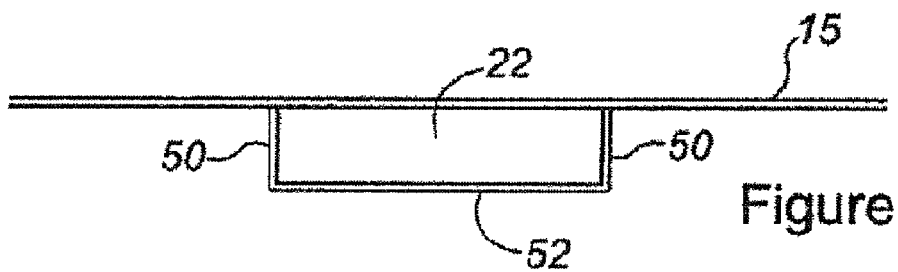
FIG. 10 depicts a top plan view of the flow-restricting baffle of the settling system depicted in FIG. 1B, according to one or more embodiments.
Figure 11:
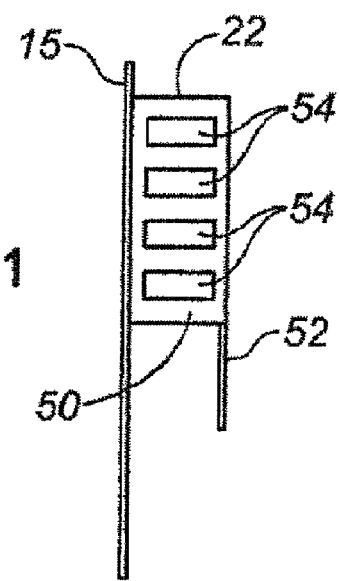
FIG. 11 depicts a side elevation view of the flow-restricting baffle of the settling system depicted in FIG. 1B, according to one or more embodiments.

Referring to FIG. 3, the bottom wall 19 of the settling tank 12 in combination with one or more inverted V-shaped ribs 62 can form one or more troughs (two are shown 38, 60) that run lengthwise along the tank 12 from the first end wall 8 to the second end wall 9. In troughs 38 and 60, respectively, one or more augers (two are shown 30, 31) can be used to move settled solids towards the outlets 32 located on the second end wall 9. In at least one specific embodiment, each auger 30 and 31 can be 10 inches in diameter and have a pitch of 10 inches. The augers 30 and 31 can be operated at any speed depending on the requirements of the drilling operation. For example, the augers 30 and 31 can be designed to turn at approximately 9 revolutions per minute or more.

Each drive mechanism 28 can include an electric motor in the 2 to 3 horsepower range coupled to a gearbox (not shown). The output of the gearbox can be coupled to each auger via a belt and pulley system (not shown). To synchronize the augers 30 and 31 to turn at the same rate, each auger 30 and 31 can have a chain sprocket and can be coupled to one another via a drive chain (not shown). It should be obvious to one skilled in the art that drive mechanism 28 can also use an internal combustion engine or a hydraulic drive system as the motive power to turn the augers. It should also be obvious that the gear ratio of the gearbox and the pulley sizes are dependent on the type of motive power used in order to obtain the desired turning rate of the augers 30 and 31.

Referring to FIGS. 4, 5, 6 and 7, the flow-reversing barrier 20 can have a vertical main back panel 46 and two vertical side panels 42 perpendicular to the back panel 46. The barrier vertical main back panel 46 and the two vertical side panels 42 can form a U-shaped structure. The flow-reversing barrier 20 can also have a bottom plate 44 disposed between the vertical side panels 42. The bottom plate can extend from the back panel 46 and along the bottom edge of the vertical side panels 42. The top of the flow-reversing barrier 20 can be supported by the support bar 40. The bottom plate 44 can rest on top of the v-shaped rib 62. One or more struts 41 can further support the flow-reversing barrier 20. The struts 41 can extend diagonally upward from the rib 62 to the bottom edge of the back panel 46. The top of the flow-reversing barrier 20 can be substantially flush with the top of the tank 12.

Referring to FIGS. 8-11, each flow-restricting baffle 22 can include a vertical back plate 52 and two vertical side walls 50 perpendicular to the vertical back plate 52. The vertical side walls 50 are preferably arranged in a U-shape. In one or more embodiments, each vertical side wall 50 can be approximately 24 inches high by 8 inches wide. Each vertical side wall 50 of the flow-restricting baffle 22 can have two or more horizontal openings (five are shown) 54 stacked vertically on side wall 50. In one or more embodiments, each horizontal opening can be approximately 6 inches wide by 2 inches high. When the fluid encounters the flow-restricting baffles 22, as described above, the fluid will strike the vertical back plate 52. Fluid can also pass through the slots 54 in the side walls 50 of the flow-restricting baffle 22. The interaction between the fluid and vertical back plate 53 and slots 54 can increase the rate at which solids are removed from the fluid.

The settling system 10 can incorporate the use of microorganisms to help to remove hydrocarbons from the solids deposited on the bottom 19 of settling tank 12. The microorganisms can be located within the troughs 38 and 60 at the bottom of the settling tank 12. After a given period of time, i.e. a sufficient time for the microorganisms to convert the hydrocarbons therein to water and carbon dioxide, the augers 30 and 31 can be used to empty the tank 12. A water flush can also be used. Afterwards, the tank 12 can be re-loaded with a fresh microorganism population and ready to process another batch of used drilling mud with cuttings.

The bioremediation of the solids in the settling tank 12 can also be continuous by employing two trains of settling tanks 10 working in parallel. One tank 12 can be off-line in clean-out mode while the other tank 12 can be in operation. This allows one tank 12 to operate at all times while the other is being flushed and/or re-loaded with the bioremediation material.

The bioremediation process can be controlled by controlling the temperature, pH, and moisture levels within settling tank 12. In addition, the augers 30 and 31 can be useful in the bioremediation process by providing mechanical agitation to stimulate the microorganism population. The augers 30 and 31 can be co-rotating or counter-rotating depending on the amount and/or degree of agitation desired within the settling tank 12. The moisture level can be controlled by adding or removing water to the various zones of the settling tank 12. Other nutrients can also be added to the settling tank 12, if needed, to accelerate or enhance the remediation process and/or to control the pH of the hydrocarbon contaminated drill cuttings.

In one or more embodiments, the microorganism population can be located in the collecting zone 16. After the solids have had sufficient time to settle toward the bottom 19 of the tank 12, the augers 30 and 31 can be activated to push the settled slurry to the collecting zone 16, as described above. In the collecting zone 16, the microorganisms can contact the solids slurry and degrade the hydrocarbon contaminated solids. In this configuration, the settling system 10 can be operated continuously with only a single tank 12. For example, the single settling tank 12 can have zones 14 and 18 with enough capacity to handle a rate of used drilling fluid that is commensurate with the rate of remediation in the collecting zone 16.

In one or more embodiments, the system 10 can accommodate a flow rate of drilling fluid in the range of 1 to 500 gallons per minute. It should be obvious to those skilled in the art that the size of the settling tank 12 and the volume of each zone is a function of the volume of drilling fluid to be recycled and the amount of solids that need to be removed from the drilling fluids to facilitate their reuse. The size and dimensions of the settling tank 12 can be scaled larger or smaller, accordingly, to suit the associated drilling operation. The number of transverse walls within the settling tank 12 can be varied, as necessary, to accommodate the volume of drilling fluid required for the drilling operations.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for bioremediating hydrocarbon contaminated solids, comprising:
   introducing a slurry comprising one or more drilling fluids and one or more hydrocarbon contaminated solids to a settling system, the settling system comprising:
   one or more housings having a receiving compartment at a first end thereof and a collecting compartment at a second end thereof;
   a barrier disposed in the receiving compartment;
   at least one wall transversely disposed in the housing between the receiving and collecting compartments, the wall having at least one aperture formed therethrough and at least one flow-restricting baffle disposed thereon, wherein the one or more baffles extend perpendicularly from the wall;
   flowing the slurry across the barrier;
   separating the hydrocarbon contaminated solids in the slurry from the drilling fluid by causing the slurry to reverse direction and flow around the barrier; and
   contacting the separated hydrocarbon contaminated solids with one or more microorganism populations disposed between the receiving compartment and the collecting department.

2. The method of claim 1, wherein the one or more housings comprises two or more housings arranged in parallel or series or a combination thereof.

3. The method of claim 1, wherein the barrier is vertically disposed in relation to the direction of slurry flow.

4. The method of claim 1, wherein contacting the separated hydrocarbon contaminated solids with one or more microorganism populations converts the hydrocarbons on or entrained in the solids into carbon dioxide, water, biomass, or a combination thereof.

5. The method of claim 4, further comprising converting the biomass into energy.

6. The method of claim 4, further comprising gasifying the biomass to provide syngas.

7. The method of claim 1, wherein the solids comprise one or more drill cuttings.

8. The method of claim 1, wherein the one or more microorganism populations are selective toward hydrocarbons.

9. A method for bioremediating hydrocarbon contaminated solids, comprising:
- introducing a slurry comprising one or more drilling fluids and one or more hydrocarbon contaminated solids to a settling system, the settling system comprising:
- one or more housings having a receiving compartment at a first end thereof and a collecting compartment at a second end thereof;
- a barrier disposed in the receiving compartment;
- at least one wall transversely disposed in the housing between the receiving and collecting compartments, the wall having at least one aperture formed therethrough and at least one flow-restricting baffle disposed thereon, wherein the one or more baffles extend perpendicularly from the wall;
- flowing the slurry across the barrier;
- separating the hydrocarbon contaminated solids in the slurry from the drilling fluid by causing the slurry to reverse direction and flow around the barrier;
- contacting the separated hydrocarbon contaminated solids with one or more microorganism populations disposed between the receiving compartment and the collecting department; and
- controlling moisture level within the one or more microorganism populations by adding or removing water to the housing.

10. The method of claim 9, wherein the one or more housings comprises two or more housings arranged in parallel or series or a combination thereof.

11. The method of claim 9, wherein the barrier is vertically disposed in relation to the direction of slurry flow.

12. The method of claim 9, wherein contacting the separated hydrocarbon contaminated solids with one or more microorganism populations converts the hydrocarbons on or entrained in the solids into carbon dioxide, water, biomass, or a combination thereof.

13. The method of claim 12, wherein further comprising gasifying the biomass to provide syngas.

14. The method of claim 9, wherein the solids comprise one or more drill cuttings.

15. An apparatus for bioremediating hydrocarbon contaminated solids, comprising:
- a housing having a receiving compartment at a first end thereof and a collecting compartment at a second end thereof;
- a substantially vertical flow-reversing barrier disposed in the receiving compartment, the barrier adapted to receive a slurry containing drilling fluid and one or more hydrocarbon contaminated solids, the barrier capable of causing the slurry to reverse direction and flow around the barrier thereby causing at least some of the solids in the slurry to separate from the drilling fluid;
- at least one wall transversely disposed in the housing between the receiving and collecting compartments, the wall having at least one aperture formed therethrough and at least one flow-restricting baffle disposed thereon, wherein the one or more baffles extend perpendicularly from the wall;
- one or more microorganism populations to selectively remove the hydrocarbons from the separated solids; and
- a conveyor for moving the separated solids from the housing.

16. The apparatus of claim 15, wherein the one or more baffles extend perpendicularly from the wall toward the collecting compartment.

17. The apparatus of claim 15, wherein the one or more baffles are adapted to separate at least some of the solids remaining in the fluid as the fluid flows in a first direction from the receiving compartment to the collecting compartment.

18. The apparatus of claim 15, wherein the microorganism population is disposed within the receiving compartment.

19. The apparatus of claim 15, wherein the microorganism population is disposed within the collecting compartment.

20. The apparatus of claim 15, wherein the microorganism population is disposed between the receiving compartment and the collecting department.

* * * * *